United States Patent
Raab et al.

(10) Patent No.: US 7,981,331 B2
(45) Date of Patent: Jul. 19, 2011

(54) SALVAGE COATING APPLICATOR AND PROCESS

(75) Inventors: Karen R. Raab, Peoria, IL (US); Beth A. Howe, Lewistown, IL (US); Cody A. McIntyre, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 774 days.

(21) Appl. No.: 11/797,010

(22) Filed: Apr. 30, 2007

(65) Prior Publication Data

US 2008/0264547 A1    Oct. 30, 2008

(51) Int. Cl.
*B23P 6/00* (2006.01)
*B29C 73/00* (2006.01)

(52) U.S. Cl. .............. 264/36.17; 264/314; 29/888.011

(58) Field of Classification Search .............. 264/36.17, 264/314; 29/888.011
See application file for complete search history.

(56) References Cited

U.S. PATENT DOCUMENTS

| | | | |
|---|---|---|---|
| 1,399,780 A * | 12/1921 | MacDonald | 264/257 |
| 3,950,177 A * | 4/1976 | Birchall et al. | 106/38.35 |
| 4,202,310 A * | 5/1980 | Zorrilla et al. | 123/668 |
| 4,853,069 A * | 8/1989 | Williams et al. | 156/401 |
| 5,071,506 A * | 12/1991 | Nelson et al. | 156/441 |
| 5,222,295 A | 6/1993 | Dorris, Jr. | |
| 5,333,668 A * | 8/1994 | Jorstad et al. | 164/100 |
| 5,341,554 A | 8/1994 | Diperstein | |
| 5,486,413 A * | 1/1996 | Kelley | 428/323 |
| 5,666,725 A * | 9/1997 | Ward | 29/888.011 |
| 5,806,751 A | 9/1998 | Schaefer et al. | |
| 5,908,522 A * | 6/1999 | Lofstrom et al. | 156/94 |
| 6,318,433 B1 * | 11/2001 | Reis et al. | 156/382 |
| 6,435,242 B1 | 8/2002 | Reis et al. | |
| 6,485,780 B1 | 11/2002 | Sangeeta et al. | |
| 6,588,485 B1 | 7/2003 | Decker | |
| 6,613,445 B2 | 9/2003 | Sangeeta et al. | |
| 6,629,956 B1 | 10/2003 | Polidoro et al. | |
| 6,663,347 B2 | 12/2003 | Roby et al. | |
| 6,672,501 B2 | 1/2004 | Fried | |
| 6,827,969 B1 * | 12/2004 | Skoog et al. | 427/142 |
| 6,881,439 B2 | 4/2005 | Graham et al. | |
| 6,904,949 B2 | 6/2005 | Decker et al. | |
| 7,188,416 B1 * | 3/2007 | Woehlke et al. | 29/888.011 |
| 2006/0081685 A1 | 4/2006 | Kinstler | |
| 2006/0266264 A1 | 11/2006 | Howe et al. | |
| 2007/0035070 A1 * | 2/2007 | Jiang et al. | 264/500 |

* cited by examiner

*Primary Examiner* — Yogendra N Gupta
*Assistant Examiner* — Jeremiah Smith

(57) ABSTRACT

A method for repairing a wear-induced void associated with a surface of a component including applying a heat-cured ceramic material to the wear-induced void, wherein the heat-cured ceramic material is configured to substantially fill the wear-induced void and providing a volume of material to a bladder configured to retain the volume of material and expand in one or more directions, wherein at least a portion of the bladder is further configured to apply at least one of pressure and heat to the heat-cured ceramic material. The method further includes applying at least one of pressure and heat, via the bladder, to the heat-cured ceramic material.

20 Claims, 5 Drawing Sheets

SALVAGE COATING APPLICATOR AND PROCESS

TECHNICAL FIELD

The present disclosure relates generally to application of a repair material, and more particularly, to repairing internal surfaces associated with damaged components.

BACKGROUND

Many manufactured components, particularly those associated with internal combustion engines, experience some form of internal surface damage during use. Such damage may result in eventual failure of the component. For example, surfaces within the fluid filled cooling jacket of an engine block may experience cavitation damage from rapid formation and collapse of vapor pockets within the cooling fluid. This damage can be particularly difficult to repair when located on irregularly shaped internal surfaces or difficult to reach areas of the component, such as are found within the cooling jacket or other areas of a cylinder bore associated with an engine block. As a result, these components are often deemed irreparably damaged and scrapped.

Remanufacturing is a process of disassembling a manufactured product such that components of the product may be cleaned, repaired or replaced, and then reassembling the product such that it is returned to a "nearly-new" condition. The goal of a remanufacturing operation may be to restore the life expectancy to that of a new product. During remanufacturing, many components may be reused with little or no processing, provided extensive damage or failure of the component has not occurred. Such a component may be inspected prior to reuse to verify its condition. Once the component's condition is verified as acceptable, the component may be cleaned and reused.

The ability to reuse a component during remanufacturing, as opposed to crafting a new one, is a fundamental goal of a remanufacturing business. Reuse of components can lead to substantial savings and, therefore, may be a key driver of profits for such businesses. It has been estimated that the U.S. automotive remanufacturing industry alone may have ten billion dollars in total annual sales. The Remanufacturing Institute, "Estimated CVG & Auto/Light Truck 2003 U.S. Expenditure on Remanufactured Components," available at http://www.reman.org/pdf/CVGmkt.pdf (2003). Given the size of the industry, cost savings obtained by maximizing reuse may have a substantial impact on remaining competitive and profitable within the industry. Further, remanufacturing may result in substantial conservation of energy and natural resources, among other things.

However, to successfully reuse a component, it may be desirable to repair damage to the component such that the component is as it was when first created. As discussed above, this has not always been possible where damage has occurred in difficult to reach areas (e.g., internal cavities) and/or on irregularly shaped surfaces. To date, repair methods for such damage have included various techniques for metal replacement (e.g., spray-on metals, welding, etc.), such techniques were very expensive and less effective than techniques utilizing repair materials (e.g., aluminum phosphates) described herein. Further, expensive skilled labor was required to execute such methods based on the precision and technique for application. Moreover, spray-on and welded metals may be subject to additional cavitation and/or damage once the component is placed back into operation, whereas utilizing embodiments of the present invention, such future damage may be substantially reduced and/or prevented depending on the repair material used (e.g., an aluminum phosphate). Given the cost of reproducing a component, even from recycled material, and the cost of utilizing skilled labor, it is highly desirable to develop methods for repairing the existing component that may be performed using less costly measures.

One system for applying pressure to repair materials on surface areas is described in U.S. Pat. No. 6,435,242 ("the '242 patent") to Reis et al. issued Aug. 20, 2002. The '242 patent describes a pressure applicator with an annular suction member for providing a suction attachment to a surface surrounding the surface to be repaired. The '242 patent further describes a flexible pressure bladder disposed beneath a cover of device and within the interior of the suction member configured to apply pressure to the surface to be repaired.

Although the disclosure of the '242 patent may provide a system for applying pressure to repair materials on surface areas, the systems and methods of the '242 patent are directed primarily to repairing external surfaces of an aircraft, which, unlike the complex geometry of a cylinder block, are more easily accessed. Further, the systems and methods of the '242 patent may be unsuitable for applying pressure to rough internal surfaces of components such as the water jacket of an engine block. The system of the '242 patent requires that a surface near the repaired area be suitable for enabling suction type or other adhesion to the surface. While this may be possible on the substantially smooth external surfaces of an aircraft, this may not be possible in areas of complex geometry such as those found in an engine block. Further, because the disclosure of the '242 patent provides no guidance as to what materials may be utilized for repairing surface damage beyond an adhesive or other filler material.

The disclosed system and method are directed to overcoming one or more of the problems set forth above.

SUMMARY OF THE DISCLOSURE

In one embodiment, the present disclosure is directed to a method for repairing a wear-induced void associated with a surface of a component. The method may include applying a heat-cured ceramic material to the wear-induced void, wherein the heat-cured ceramic material is configured to substantially fill the wear-induced void and providing a volume of material to a bladder configured to retain the volume of material and expand in one or more directions, wherein at least a portion of the bladder is further configured to apply at least one of pressure and heat to the heat-cured ceramic material. The method may further include applying at least one of pressure and heat, via the bladder, to the heat-cured ceramic material.

In another embodiment, the present disclosure is directed to a process for repairing a bore of a cylinder block including a wear-induced void. The process may include applying a repair material to the wear-induced void within the bore of the cylinder block, applying a portion of an inflatable bladder to the repair material to cause pressure to be exerted against the repair material and the wear-induced void, and applying heat to the repair material. The process may further include curing the repair material, wherein the curing is configured to cause the repair material to harden and substantially fill the wear-induced void.

In yet another embodiment, the present disclosure is directed to a process for applying a heat-cured ceramic material to a metal substrate. The process may include providing a heat-cured ceramic material to the metal substrate, applying a pressure to the heat-cured ceramic material and the metal substrate, and raising the temperature of the heat-cured ceramic material and the metal substrate to a predetermined temperature and holding the temperature at the predetermined temperature for a predetermined period of time. The method may further include grinding the heat-cured ceramic material and the metal substrate to a uniform thickness.

In yet another embodiment, the present disclosure is directed to an apparatus for repairing surfaces associated with a cavity of a component. The apparatus may include a frame, including one or more fastening points, wherein the frame is configured to be fastened, via the one or more fastening points, to one or more preexisting fastening points external to the cavity associated with the component and a bladder, resiliently connected to the frame and configured to retain a volume of material and expand in one or more directions, wherein at least a portion of the bladder is further configured to be inserted into the cavity. The apparatus may further include a valve fluidly connected to the bladder, wherein the valve is accessible from outside the cavity following insertion of the portion of the bladder.

DETAILED DESCRIPTION

Figure 1A:
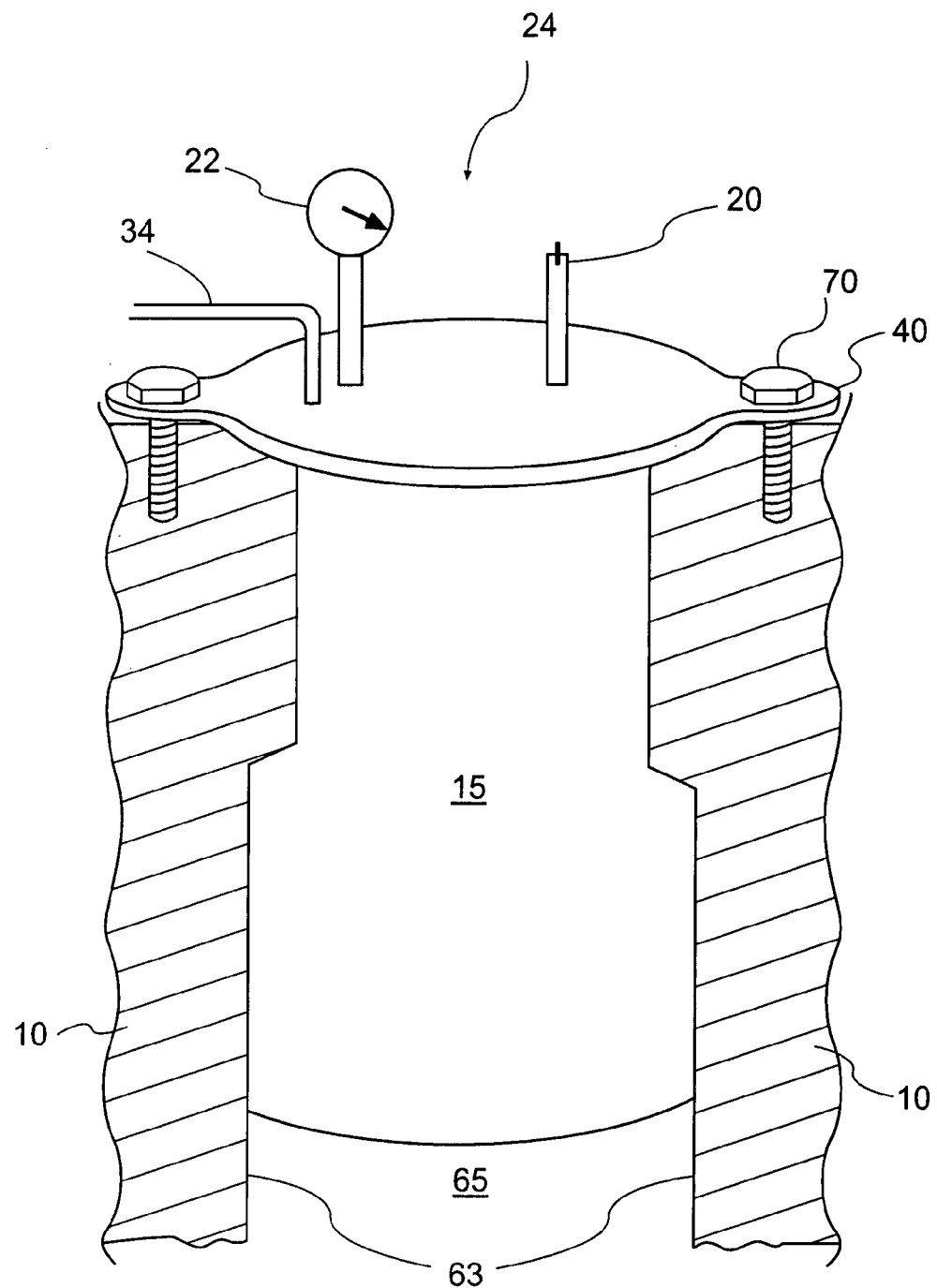
FIG. 1A is a simplified illustration of an applicator apparatus inserted into a cavity according to an embodiment of the present disclosure.

FIG. 1A is a simplified illustration of applicator apparatus 24 inserted into a cavity 65 associated with a component 10 to be repaired. Component 10 may be any component with internal cavities requiring surface repair (e.g., surfaces including cavitation and/or other wear-induced voids/damage). For example, component 10 may include an engine block, a boiler tube, a combustor can, etc. "Cavity" as used herein, shall mean any orifice, chamber, hollow, or other area defined by internal surfaces of a component. For example, cavity 65 may include a cylinder bore of an engine block, the inside of a steam generator boiler tube, internal areas of a combustor can of a gas turbine, or any other suitable cavity. As can be seen in FIG. 1, component 10 includes cavity walls 63 (i.e., surfaces) which may form a cavity 65 internal to component 10. Applicator apparatus 24 may, therefore, be configured to be inserted into cavity 65.

Fasteners 70 may be utilized to affix applicator apparatus 24 to component 10 via fastening points 40 and preexisting fastening points associated with component 10. Fasteners may include, for examples, bolts, screws, rivets, and any other suitable fastener.

Upon insertion of applicator apparatus 24 into cavity 65, a volume of material (e.g., air, nitrogen, water, sand, and the like) may be provided to valve 20 causing an expansion of bladder 15, which may, in turn, cause bladder 15 to exert a force against cavity walls 63 or other contacted materials and/or surfaces. One of skill in the art will recognize that FIG. 1A is meant to be exemplary only and that numerous other cavity shapes and sizes may be repaired with systems and methods of the present disclosure.

Figure 1B:
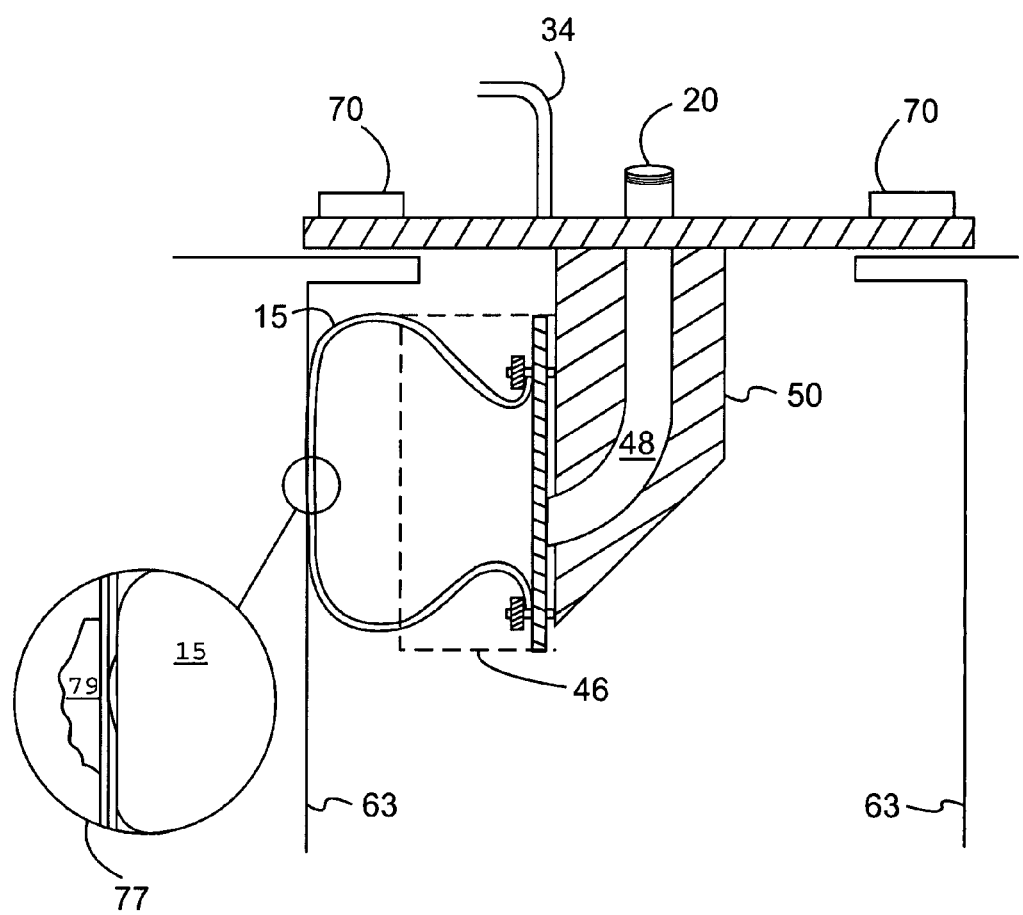
FIG. 1B is a simplified side view of an applicator apparatus inserted into a cavity according to an embodiment of the present disclosure.

FIG. 1B is a simplified side view of an applicator apparatus inserted into a cavity according to an embodiment of the present disclosure. As can be seen in FIG. 1B, bladder 15 may be caused to contact surfaces associated with cavity walls 63. Such surfaces may include one or more wear-induced voids 79 (e.g., cavitation damage) where material has been removed from the surface to be repaired. Enhanced view 77 shows a close-up illustration of an exemplary surface associated with cavity walls 63 containing wear-induced voids 79. Application of a repair material to surfaces associated with cavity walls 63 and/or wear-induced voids 79 will be discussed below in greater detail with reference to FIG. 3.

Figure 2A:
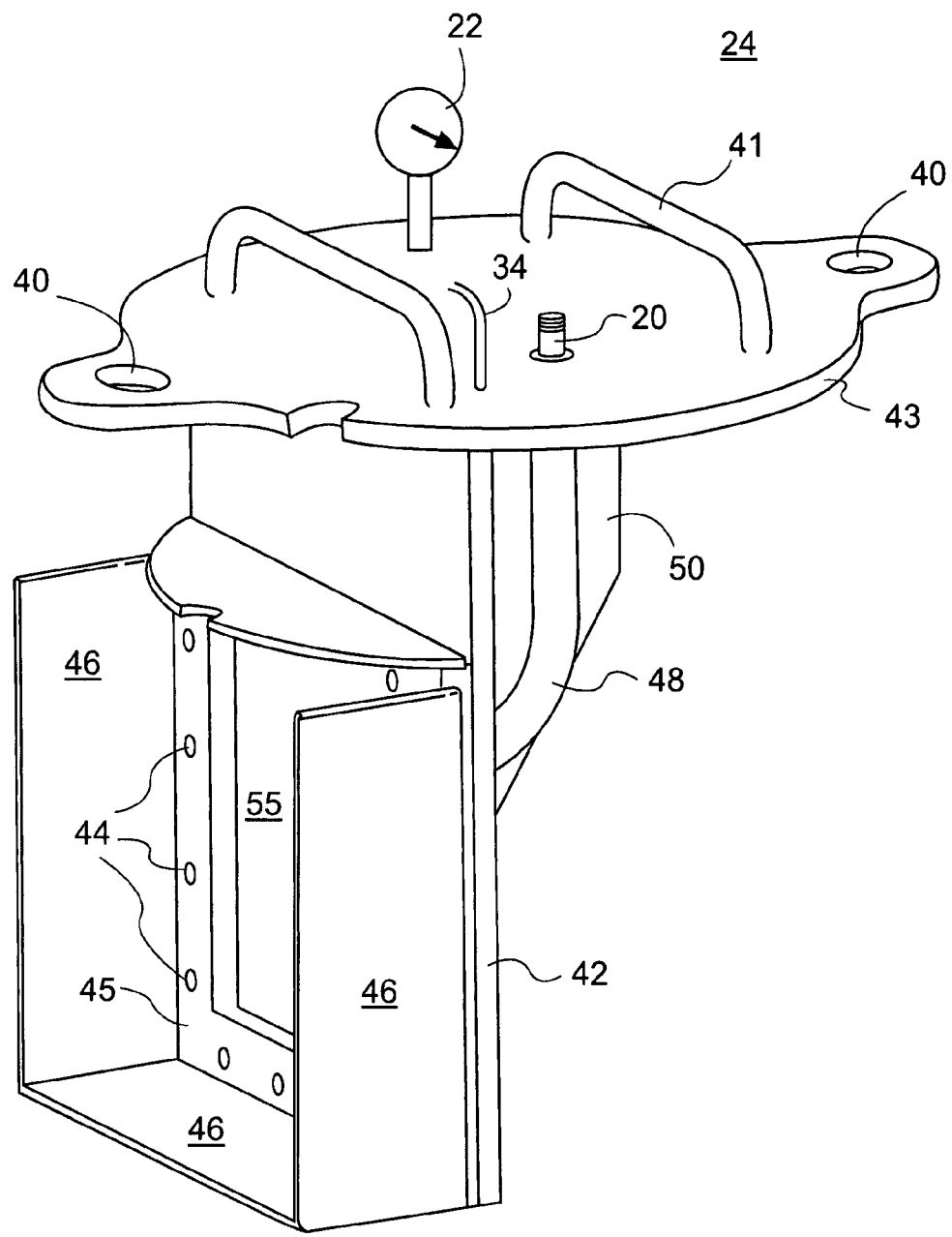
FIG. 2A is a perspective view of an applicator apparatus according to one embodiment of the present disclosure.
Figure 2B:
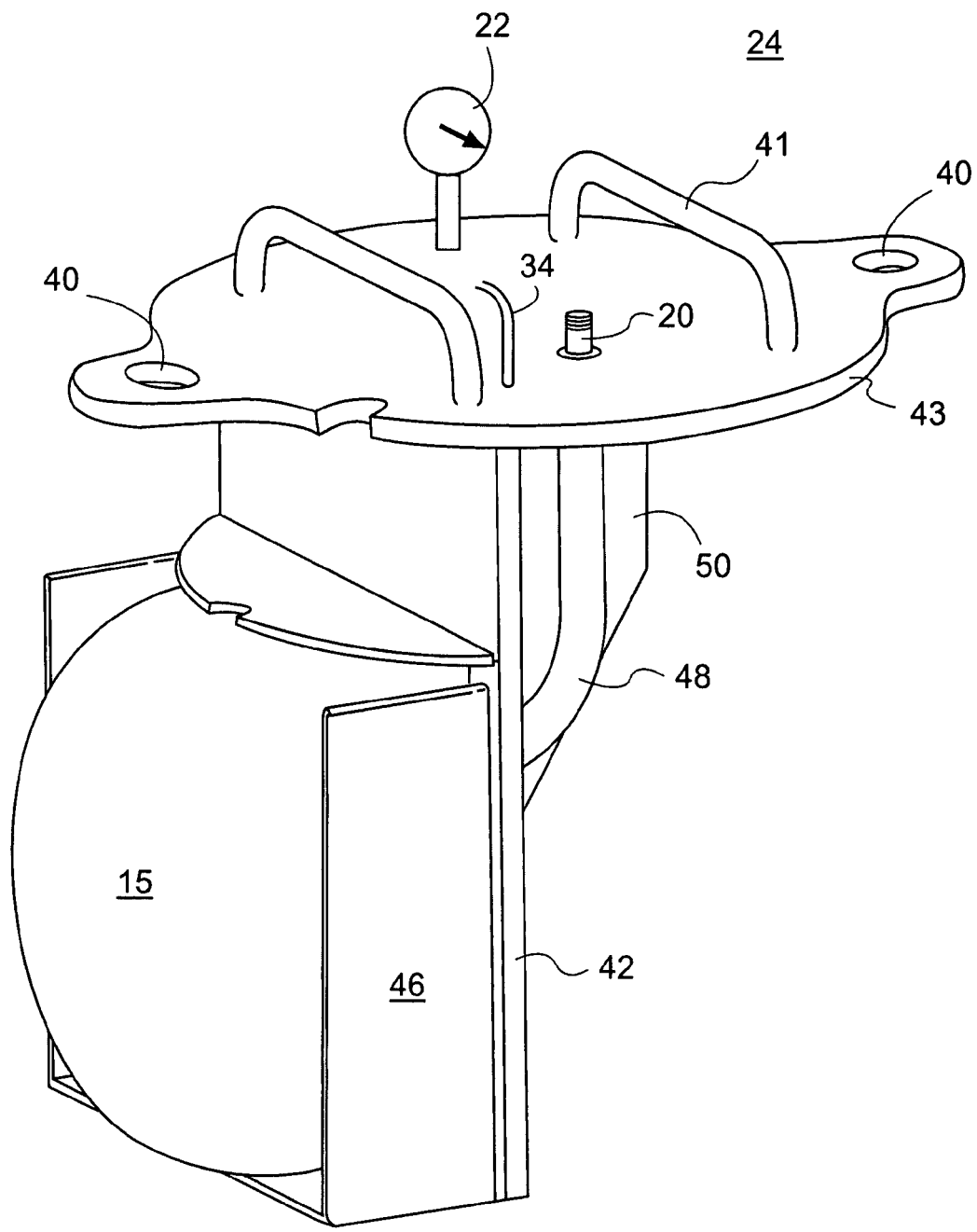
FIG. 2B is a perspective view of an applicator apparatus including a partially inflated bladder according to one embodiment of the present disclosure.

FIG. 2A is an illustration of an applicator apparatus according to one embodiment of the present disclosure. Applicator apparatus 24 may include a frame 42, bladder retainer 45, bladder restraint 46, cover plate 43, and fluid passage 48. Applicator 24 may further include bladder 15, which is not shown in FIG. 2A for purposes of demonstrating the supporting structure of applicator apparatus 24. Bladder 15 is displayed in FIG. 2B retaining a volume of material (i.e., in an expanded state) for purposes of example only.

Frame 42 may be configured to provide support to bladder 15 while opposing forces exerted by bladder 15 upon a repair material (e.g., an aluminum phosphate material) disposed on an internal surface of a component. Such forces may be exerted by bladder 15 as a result of the expansion of bladder 15 in response to retention of a volume of material (e.g., air, sand, etc.). For example, bladder 15 may receive a volume of material and in so doing, expand in multiple directions away from frame 42. So that the expansion of bladder 15 may exert a force against the repair material and a surface of a cavity (e.g., a cylinder bore in an engine block), frame 42 may provide rigid support against the reactive forces exerted by bladder 15.

Frame 42 may further be configured to be inserted into various cavities to be repaired. Frame 42 may be custom-designed to fit an array of known cavities, or frame 42 may be designed as a generic "one size fits many" component. For example, where applicator apparatus is to be used in a remanufacturing operation for repair of a particular line of engine blocks, frame 42 may be specifically designed to fit cavities associated with the line of engine blocks to repair. Alternatively, frame 42 may be designed to fit in numerous cavities that may be repaired during the course of remanufacturing at a particular facility.

Frame 42 may be fabricated from metal, plastic, or other suitable material. For example, frame 42 may be fabricated from materials including steel, iron, aluminum, or PVC. Additionally, various pieces of such material may be welded or otherwise affixed to each other to form a shape associated with frame 42.

Frame 42 may include one or more support members 50 configured to provide additional support to frame 42. Support members 50, like frame 42, may be designed to fit a particular cavity in conjunction with frame 42, or alternatively, support members 50 may be designed such that one size fits many cavities. Support members 50 may be rigidly affixed to frame 42 to provide support to frame 42 and may be fabricated from any suitable material. Such materials may include metals and/or plastics or any other rigid material. Support members 50 may further provide a connection between frame 42 and cover plate 43 for additional structural support.

Bladder 15 may be resiliently connected to frame 42 and configured to remain substantially sealed around a periphery of bladder 15. For example, an appropriately shaped section of bladder material forming bladder 15 may be disposed between a bladder retainer 45 and frame 42. Bladder retainer 45 may be configured to be rigidly connected to frame 42 via one or more retainer fastening points 44 set around a periphery of bladder retainer 45. Fasteners (not shown) may then secure bladder retainer 45 to frame 42 via retainer fastening points 44. In one embodiment, securing of bladder retainer 45 to frame 42 may effect a pressure type fastening/sealing of bladder 15 to frame 42 resulting in a substantially sealed union and formation of a fluid chamber 55 within the sealed periphery. Additionally, holes coinciding with fastening points 44 may be created in bladder 15. Fasteners (not shown) associated with retainer fastening points 44 may then be passed through the holes created in bladder 15 and secured to frame 42 potentially creating a stronger bond and reducing the chance for slipping of bladder 15 depending on the material utilized for bladder 15. One of skill in the art will recognize that numerous methods for fastening/sealing bladder 15 to frame 42 may be utilized without departing from the scope of the present disclosure.

Bladder 15 may be configured to retain a volume of material within fluid chamber 55 while expanding in one or more directions in response to such fluid retention. Bladder 15 may further be configured to apply pressure to a repair material (e.g., an aluminum phosphate material) disposed upon a surface of a cavity as a result of the expansion in one or more directions. Bladder 15 may include substantially elastic materials varying in thickness depending on the material and application for which applicator apparatus 24 is configured. In one embodiment, a bladder material may be capable of expanding to eight times its original surface area when retaining a particular volume of material and may be substantially resistant to temperatures up to 315 degrees C. Bladder materials may also be substantially impermeable to fluids suited for use within bladder 15. Bladder 15 may include silicone, rubber, latex, and other suitable materials in thicknesses between about 0.03 inch to 0.40 inch. One of skill in the art will recognize that numerous other materials may be suitable for use as bladder 15 and that other methods for sizing bladder 15 may be utilized. The scope of the present disclosure is intended to include such methods.

Bladder 15 may be in fluid communication with fluid passage 48, which may, in turn, be in fluid communication with valve 20. Fluid passage 48 may be configured to direct a volume of material (e.g., air, nitrogen, water, etc.) to and from fluid chamber 55 and valve 20. In one embodiment, fluid passage 48 may lead from valve 20 to an outlet (not shown) located within fluid chamber 55 such that a fluid introduced via valve 20 may remain within the substantially sealed section of bladder 15. Valve 20 may be configured to allow a volume of material to pass from an external fluid source into fluid passage 48, and in turn to fluid chamber 55. Valve 20 may be a Schrader valve, a Presta valve, or any other suitable fluid control valve.

Bladder restraint 46 may be configured to restrain the expansion of bladder 15 in response to the retention of a volume of material within fluid chamber 55. In one embodiment of the present disclosure, it may be desirable to cause the expansion of bladder 15 to be directed toward a particular area of a cavity. For example, where cavitation damage regularly appears in the same area of a cylinder bore in an engine block, it may be desirable to configure the expansion of bladder 15 toward that area such that maximum force may be applied to a repair material. Therefore, bladder restraint 46 may be configured to restrain the expansion of bladder 15 while allowing expansion primarily in a direction parallel to the sides of bladder restraint 46. Bladder restraint 46 may further be designed based on the dimensions of the cavity into which applicator apparatus 24 may be inserted. Alternatively, in another embodiment, it may be desirable to allow bladder 15 to expand in all directions, limited by the force supplied by frame 42 and surfaces of the cavity into which applicator apparatus 24 has been inserted. In such an embodiment, bladder restraint 46 may be configured to provide the desired expansion characteristics of bladder 15.

Cover plate 43 may be connected to frame 42 and/or support members 50 and may be configured to enable fastening of applicator apparatus 24 to component 10 following the insertion of applicator apparatus 24 into a cavity of the component. Cover plate 43 may include similar materials to those used in construction of frame 42 and support members 50 (e.g., steel, plastic, etc.) and may be connected to frame 42 and/or support members 50 via any suitable connection method. In one embodiment, cover plate 43 may be further configured to be fastened to component 10 utilizing fastening points 40. Fastening points 40 may be configured to align with one or more preexisting fastening points associated with component 10. For example, a cylinder block of a particular engine design may have cylinder head fastening bolt holes located at specified intervals on the cylinder block coinciding with bolt holes in an associated cylinder head. Fastening points 40 associated with applicator apparatus 24 may therefore be positioned according to the specified intervals associated with the cylinder head fastening points of the engine block. Upon insertion of applicator apparatus 24, an operator may align fastening points 40 with the respective preexisting fastening points associated with the engine block, and fasteners may be inserted and tightened to a desired torque.

Cover plate 43 may be configured to substantially cover the cavity into which applicator apparatus 24 is inserted, while providing support to applicator apparatus 24 during operation. Cover plate 43 may further allow access to additional elements associated with applicator apparatus 24, including, for example, a pressure gauge 22, grip points 41, accessory connectors 34, and valve 20. Grip points 41 may be useful for inserting and guiding applicator apparatus 24 into a cavity associated with component 10. Grip points 41 may also be utilized for carrying, storage, and tagging, among other things, of applicator apparatus 24. Pressure gauge 22 may be utilized for determining and displaying a pressure within fluid chamber 55 and a related pressure applied to a surface of the cavity into which applicator apparatus 24 has been inserted. Pressure gauge 22 may include a mechanical, electro-mechanical, or any other suitable pressure measuring device. In addition, pressure gauge 22 may include a pressure transducer (not shown) for connection to a controller (not shown) associated with applicator apparatus 24.

One or more accessory connectors 34 may also be provided on cover plate 43. Accessory connectors 34 may include pass-through tubes, electrical junctions, tie-downs, or other suitable devices. Accessory connectors 34 may be configured to provide various additional functionality to applicator apparatus 24 and/or access to components beyond cover plate 43 while portions of applicator apparatus 24 are inserted into a cavity. For example, it may be desirable to apply heat to a surface of a cavity associated with component 10. In such an embodiment, one or more accessory connectors 34 may be linked to heating elements associated with applicator apparatus 24 and bladder 15. Such heating elements may be located within frame 42, fluid chamber 55, or other suitable location for providing heat within the cavity. Further, additional accessory connectors 34 may function as thermocouples, among other things, for determining a temperature associated with surfaces of component 10. These thermocouples may be communicatively connected to a controller (not shown) associated with applicator apparatus 24. One of skill in the art will recognize that more or fewer accessory connectors may be provided as desired and the present disclosure is not intended to be limiting.

INDUSTRIAL APPLICABILITY

The disclosed systems and methods for remanufacturing components may be applicable to any components having damage on surfaces associated with a complex geometry (e.g., internal surfaces of a cylinder block). The disclosed systems and methods for remanufacturing such components may allow a substantial number of previously discarded components to be reused during remanufacturing based on a repair of internal damage not previously repairable. Further, the disclosed system and methods may also be applicable to repairing components manufactured with cast metal porosity defects and for applying a material frosting to a component (e.g., frost coating a turbocharger housing).

The disclosed systems and methods may be particularly applicable to repairing cavitation or similar damage associated with a cast iron cylinder block of an internal combustion engine and/or other cast metal components with porosity defects. Cavitation damage may occur within the water jacket of the internal combustion engine during operation. As a piston associated with a cylinder reciprocates within the cylinder liner, expansion and contraction of the cylinder liner may occur, thereby causing vibration and bubble formation within a cooling fluid in the waterjacket. The formed bubbles may then collapse at or near surfaces associated with the cylinder block, which may result in removal of material and creation of wear-induced voids at locations of collapse. The wear-induced void may appear in substantially consistent locations relative to the cylinder liner and may result in significantly less cylinder block material between the water jacket and other areas of the internal combustion engine.

Figure 3:
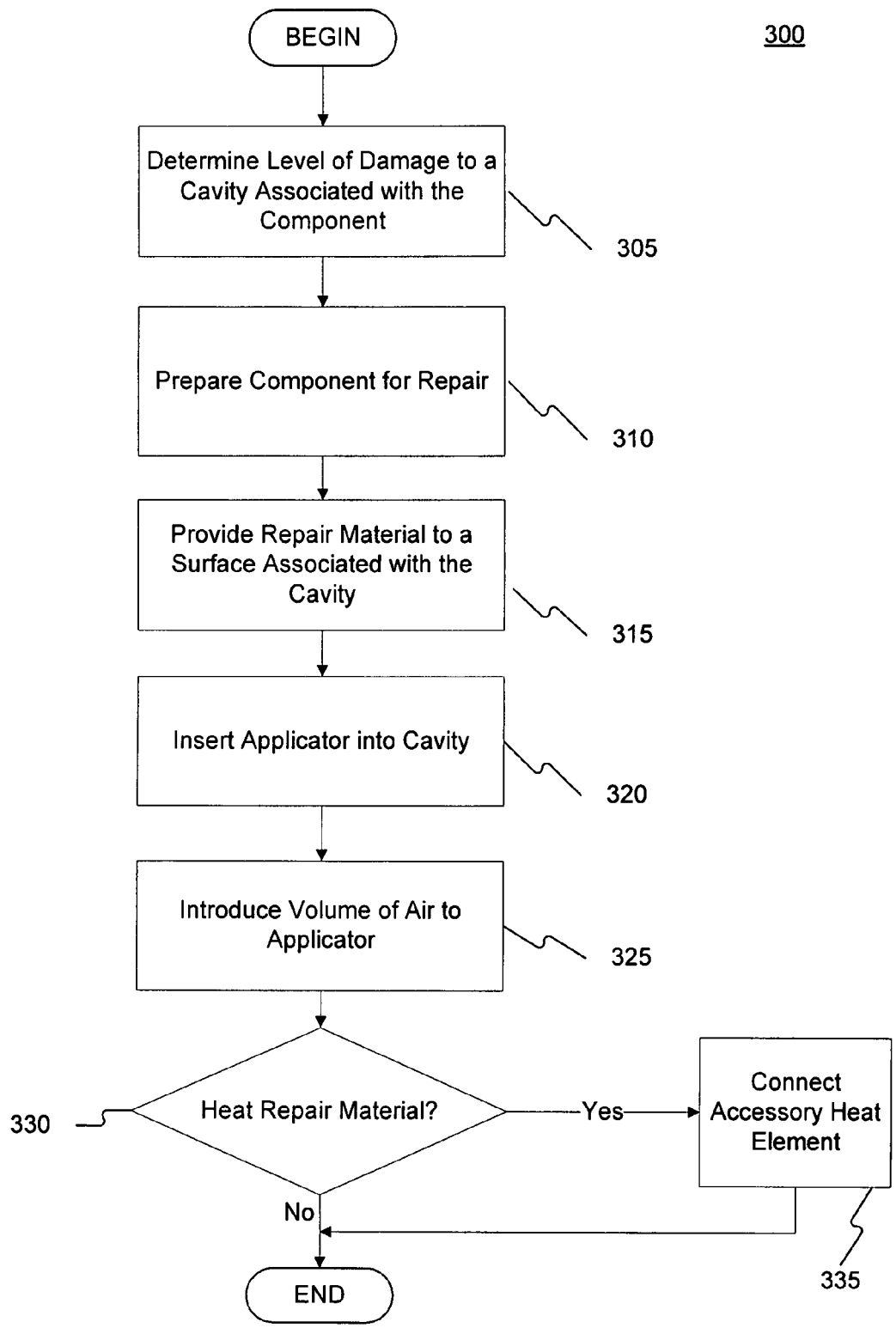
FIG. 3 is an exemplary flowchart illustrating one method for utilizing a applicator apparatus consistent with the present disclosure.

FIG. 3 is an exemplary flowchart illustrating one method for utilizing an applicator apparatus consistent with the present disclosure to repair surfaces associated with a cavity of a component to be remanufactured. Prior to utilization of applicator apparatus 24, it may be desirable to determine components that are suitable for remanufacture and repair. In one embodiment, component 10 (e.g., a cylinder bore of an engine block) may be subjected to preliminary testing to determine the level of damage to cavity walls 63 of cavity 65 (step 305). Such an analysis may include a visual inspection, a borescopic inspection, and/or measurement of detected flaws, among other things. For example, a technician may visually inspect component 10 looking for any signs of noticeable flaws (e.g., cavitation damage and the like). Such an inspection may be carried out with special tools (e.g., magnifying glass, borescope, etc.), or, alternatively, only the eyes of the technician. Where a technician determines the damage to be too severe, the component may be scrapped for material recycling.

Components passing the inspection test may be identified as candidates for remanufacture and may be prepared for repair (step 310). Numerous steps may be taken to prepare component 10 for repair including, for example, washing, sanding, polishing, and/or chemical treating, among other things. In one embodiment, component 10 may be bathed multiple times in a salt bath configured to provide substantial cleansing of areas to be repaired. For example, cavity walls 63 may include cavitation damage with material deposits where cavitation has removed original material. An eight step bathing procedure utilizing a saline solution at varying temperatures and fluid velocities, may be utilized to substantially cleanse the areas of cavity walls 63. The goal of such treatment may be to remove deposits from cavity walls 63, which may react or otherwise negatively impact a repair process while also oxidizing the surface for better adhesion of a repair material. Alternatively, spot cleaning of the damaged areas may be performed as desired. Appropriate preparation steps may vary according to the component material and process, among other things. Those of ordinary skill in the art may identify and select appropriate preparatory steps. Further, preparation of component 10 may be optional and may not be executed unless desired.

Once component 10 has been prepared, if necessary or desired, a repair material may be provided to damaged surfaces of cavity walls 63 (step 315). Repair materials may include metal-phosphate binders (e.g., aluminum phosphates), epoxies, and various other suitable substances configured to provide the desired repair result. For example, a heat-cured ceramic material (e.g., a metal-phosphate binder) similar to those described in U.S. Patent Pub. 20060266264 to Howe et al. (the '264 publication) may be utilized with systems and methods of the present disclosure. The contents of the '264 publication are herein incorporated by reference in their entirety. Repair materials may be configured as pastes, slurries, solutions, preformed patches, and/or any other suitable configuration to be spread or otherwise applied to damaged areas of cavity walls 63. In one embodiment, a repair material may be applied to areas utilizing a spatula, stick, or other suitable applicator. For example, a paste including an aluminum phosphate material may be spread with a spatula over cavitation damage associated with cavity walls 63.

After providing the repair material to the repair area, a secondary material may be placed on top of the repair material to act as a cover and protect against repair material's adhesion to bladder 15 and assist in curing of the repair material. Such materials may include, for example, sheets of Teflon or other fluorocarbon materials configured to prevent or substantially limit adhesion between a repair material and bladder 15. One of skill in the art will recognize that other materials, curing conditions, and/or methods may be utilized when applying a repair material and this disclosure is not intended to be limiting.

In another embodiment, preformed "patches" of repair material may be utilized for placement over an area to be repaired. The preformed patches may be formed to a particular size and shape, and be configured to self-adhere to a repair area such that an operator may easily "stick and go." The preformed patches may also include a secondary material (e.g., Teflon) configured to prevent adhesion between bladder 15 and the preformed patch of material. In other words, an operator may place the preformed patch in a desired location, and easily begin the curing process.

Once the repair material, and where desired, secondary material, have been applied, applicator apparatus 24 may be aligned and inserted into cavity 65 and secured to component 10 via fastening points 40 (step 320). Alternatively, the secondary material may be disposed on bladder 15 of applicator apparatus 24 prior to insertion into cavity 65. Once applicator apparatus 24 has been inserted and fastened to the component, a volume of material (e.g., air, nitrogen, water, sand, etc.) may be introduced to valve 20 with the intention of causing an expansion of bladder 15 and a pressure being exerted on the repair material and/or a secondary material (step 325). The volume of material introduced may be calculated to cause a predetermined expansion of bladder 15 that may, in turn, cause bladder 15 to exert a predetermined pressure upon contact with the repair material, secondary material, and/or cavity walls 63. For example, it may be known that a particular repair material cures adequately between a range of pressures at a particular temperature. A volume of material causing bladder 15 to exert a pressure within such a range may, therefore, be introduced to valve 20. Alternatively, a pressure associated with bladder 15 may be monitored using pressure gauge 22, pressure transducer (not shown), or other suitable method. In one embodiment, a controller may be communicatively connected to pressure transducer (not shown) and may control introduction of a volume of material (e.g., air) from a fluid source. Such control may allow the controller to set the pressure based on algorithms or other determinations.

It may be desirable, based on a repair material, to utilize particular curing conditions once a repair material has been applied. For example, when utilizing repair materials similar to those described in the '264 publication, it may be desirable to raise the temperature of the repair material to approximately 260 degrees C. while bladder 15 exerts a pressure of approximately 20 pounds per square inch over a period of approximately 12 hours. The temperature increase may be performed using a standard ramp or a "ramp and hold" technique. For example, repair materials similar to those described in the '264 patent application may be particularly useful in such a scenario, because at approximately 180 degrees C., such materials begin to flow. This flow may enable the material to easily penetrate and fill various areas of material deficiency (e.g., cavitation damage), particularly when held in place by bladder 15. Therefore, ramping the temperature through 180 degrees C. may allow for sufficient flow and penetration.

During the curing process, the repair material may generate and/or absorb heat as well as releasing certain substances in gas or liquid form (e.g., water vapor). In such an embodiment, it may be desirable to adjust heat and temperature for various reasons, including, for example, ensuring that the repair material does not lose contact with the repair area and/or to allow or prevent movement of materials generated during curing (e.g., gas bubbles). For example, when utilizing the repair material described in the '264 publication, water vapor or other gasses may be generated during curing, which may, in turn, cause bubble formation within the repair material. By adjusting the pressure and/or temperature (e.g., increased pressure and decreased temperature), it may be possible to force the generated gasses to remain within the material, thereby causing a porous repair material formation. Alternatively, pressure and temperature may be adjusted (e.g., decreased pressure and increased temperature) such that the generated gasses and/or bubbles are allowed to escape, thereby resulting in a substantially non-porous repair material following the curing process. One of skill in the art will recognize that such adjustments may differ based on the repair material used and the surface to be repaired, among other things. Further, more or fewer conditions may be desirable when curing a repair material.

Where it is desired to warm a repair material during a desired curing step (step 330: yes), one or more accessory connectors 34 may be connected to a power source (step 335). For example, a heating element and a thermocouple may be associated with applicator apparatus 24 and operatively connected to one or more accessory connectors 34. Accessory connectors 34 may therefore be connected to a power source and/or a controller configured to control temperature. The thermocouple may provide current temperature information to the controller and the controller may, in turn, adjust the amount of power supplied to the heating element, thereby controlling temperature. This, combined with pressure control, may allow a particular material to be cured at substantially optimal temperature and pressure ranges. Alternatively, no heat may be applied to the cavity and repair material (step 330: no).

Because the systems and methods of the present disclosure utilize a material configured to flow and fill material deficient areas, significant cost savings may be realized based on materials and labor for application. For example, it may be possible to utilize significantly less skilled labor and less costly materials to repair and restore components. This may allow the reuse of such components and a realization of substantial cost savings. Further, application of materials utilizing systems and methods of the present disclosure may result in a surface stronger than the original metal substrate. This may be particularly true for cast iron components, such as, for example, a cylinder block.

In addition, because the systems of the present disclosure utilize a flexible bladder configured to be inserted into a cavity associated with component 10, repair materials may be applied using pressure and/or heat to difficult-to-reach and/or uneven surfaces associated with a cavity of the component (e.g., wear-induced voids). The bladder, upon retaining a volume of material, may then adapt to the surrounding shapes and structures while applying pressure to the internal surfaces of the cavity. Moreover, because the systems and methods of the present disclosure are fastened to preexisting fastening points associated with a component, substantially all internal surface configurations may be repaired.

It will be apparent to those skilled in the art that various modifications and variations can be made to the systems and methods described herein. Other embodiments will be apparent to those skilled in the art from consideration of the specification and practice of the disclosed remanufacturing process. For example, in one embodiment, frame 42 may not be used and bladder 15 may remain sealed except for a valve configured to introduce a volume of material to bladder 15. It is intended that the specification and examples be considered as exemplary only, with a true scope being indicated by the following claims and their equivalents.

We claim:

1. A method for repairing a wear-induced void on a surface of a cavity of a component using an expandable bladder, the bladder being coupled to a frame that is configured to be inserted into the cavity, the frame being configured to restrain the expansion of the bladder so as to directionally expand the bladder, the method comprising:
   applying a heat-cured ceramic material to the wear-induced void, wherein the heat-cured ceramic material is configured to substantially fill the wear-induced void;
   inserting the frame into the cavity and aligning the frame opposite the wear-induced void;
   providing a volume of material to the bladder to expand the bladder against the frame so as to isolate the expansion of the bladder against the cavity in only the vicinity of the wear-induced void; and
   applying at least one of pressure and heat, via the bladder, to cure the heat-cured ceramic material.

2. The method of claim 1, wherein the wear-induced void exists on an inside surface of the cavity.

3. The method of claim 2, wherein the cavity includes a bore of a cylinder block.

4. The method of claim 1, wherein the bladder expansion results in a pressure of approximately 20 pounds per square inch on the heat-cured ceramic material.

5. The method of claim 1, wherein providing heat to the heat-cured ceramic material is performed utilizing a predetermined ramp rate and hold time.

6. The method of claim 5, wherein the predetermined ramp rate and hold time are configured to cause removal of solvent material from the heat-cured ceramic material.

7. The method of claim 1, wherein the material includes air.

8. The method of claim 1, wherein the heat-cured ceramic material includes an aluminum phosphate.

9. A process for repairing a bore of a cylinder block including a wear-induced void using an expandable bladder, the bladder being coupled to a frame that is configured to be inserted into the cavity, the frame being configured to restrain the expansion of the bladder so as to directionally expand the bladder, comprising:
applying a repair material to the wear-induced void within the bore of the cylinder block, wherein the repair material includes an heat-cured ceramic material;
inserting the frame into the bore;
aligning the frame with the wear-induced void;
expanding the bladder to contact a side of the bore that includes the wear-induced void without contacting an opposite side of the bore, so as to apply at least a portion of the expanded bladder to the repair material to cause pressure to be exerted against the repair material in the wear-induced void; and
curing the repair material, wherein the curing is configured to cause the repair material to harden and substantially fill the wear-induced void.

10. The process of claim 9, wherein the heat-cured ceramic material includes an aluminum phosphate.

11. A method for repairing a void on a surface within a cylinder bore of an engine cylinder block using an expandable bladder coupled to a frame configured to be inserted into the cylinder bore, comprising:
preparing the surface of the cylinder bore for repair;
filling the void with a repair material in an uncured state;
applying a release layer to the surface of the cylinder bore to cover the repair material in the void;
inserting the frame including the bladder into the cylinder bore, the frame being configured to restrain the expansion of the bladder so as to directionally expand the bladder in a direction towards the void;
aligning the frame such that the frame is positioned opposite the void;
expanding the bladder such that the expanded bladder selectively contacts a first area of the cylinder bore without contacting a second area of the cylinder bore, the first area including a surface within the cylinder bore that includes the void, and the second area including a surface within the cylinder bore that surrounds the first area;
applying at least one of pressure and heat on the repair material using the expanded bladder to cure the repair material;
removing the release layer to expose the cured repair material on the surface of the cylinder bore.

12. The method of claim 1, wherein the providing a volume of material includes expanding the bladder to contact a first area of the surface of the cavity without contacting a second area of the surface, the first area being an area of the surface that includes the wear-induced void and the second area is an area of the surface that surrounds the first area.

13. The method of claim 1, wherein the frame includes side panels that are configured to preferentially expand the bladder in a preferred direction, and providing a volume of material to the bladder includes expanding the bladder against the side panels.

14. The method of claim 9, wherein providing a volume of material includes expanding the bladder from one side of the frame within the bore without expanding the bladder from an opposite side of the frame within the bore.

15. The process of claim 9, wherein the frame includes side panels that are configured to expand the bladder in a preferred direction, and expanding the bladder includes expanding the bladder against the side panels.

16. The process of claim 9, wherein curing the repair material includes heating the repair material at a predetermined ramp rate.

17. The process of claim 9, wherein expanding the bladder includes contacting a first area of the side of the bore that includes the wear-induced void without contacting a second area of the side, the second area being an area that surrounds the first area.

18. The method of claim 11, wherein expanding the bladder includes expanding the bladder from one side of the frame within the cylinder bore without expanding the bladder from an opposite side of the frame within the cylinder bore.

19. The method of claim 11, wherein filling the void with a repair material includes filling the void with a material that includes an aluminum phosphate.

20. The method of claim 11, wherein expanding the bladder includes expanding the bladder using air.

* * * * *